United States Patent [19]

Utsumi

[11] Patent Number: 4,574,558
[45] Date of Patent: Mar. 11, 1986

[54] APPARATUS FOR THE APPLICATION OF WRAPPED ARTICLES TO PACKAGE CONTAINERS

[75] Inventor: Yoshikazu Utsumi, Kyoto, Japan

[73] Assignee: Tetra Pak International Aktiebolag, Alle Lund, Sweden

[21] Appl. No.: 565,013

[22] Filed: Dec. 22, 1983

[30] Foreign Application Priority Data

Dec. 24, 1982 [JP] Japan .................................. 57-232089
Dec. 29, 1982 [JP] Japan .................................. 57-234782

[51] Int. Cl.⁴ ............................................. B32B 31/00
[52] U.S. Cl. ..................................... 53/128; 198/339.1
[58] Field of Search ................. 53/128, 410, 415, 420; 198/480, 339, 689; 294/64 A, 64 B; 493/222

[56] References Cited

U.S. PATENT DOCUMENTS

3,716,307  2/1973  Hansen ............................ 294/64.2 X
3,775,909  12/1973  Best et al. ...................... 198/480 X
3,910,811  10/1975  Paxton et al. .................... 53/128 X

Primary Examiner—James F. Coan
Attorney, Agent, or Firm—Koda and Androlia

[57] ABSTRACT

An apparatus for the application of wrapped articles to package containers which includes a transferring and sealing device by means which articles are transferred and sealed to the surface of a package container which is carried in a bucket wheel. The apparatus is further characterized in that the bucket wheel is provided with an odd number of compartments and the pitch between packages on a conveyor supplying packages to the bucket wheels is twice the pitch of the compartments on the bucket wheel. In addition, the transferring and sealing device inclines the articles so that they are obliquely adhered to the package containers.

5 Claims, 18 Drawing Figures

APPARATUS FOR THE APPLICATION OF WRAPPED ARTICLES TO PACKAGE CONTAINERS

BACKGROUND OF THE INVENTION

1. Field of the Invention

The present invention relates to apparatuses for the application of wrapped articles to package containers and more particularly to bucket wheels and transferring devices in such apparatuses.

2. Prior Art

In the prior art it is has been frequently found that other items must be added to a package container for food. Such other items are typically a package containing a straw or a spoon, etc. which is provided in a small bag which must adhered to the sideface of the package container for the food by an automatic machine. In such a case, after continuously conveying the package container for the food, the prior art method includes a bucket wheel for transferring the package container from the conveyor. The rotation of the bucket wheel carries the package container to a position wherein the small bag-like package containing the straw or spoon is adhered to the package container. In the prior art such a method requires a wheel for supplying the package container, i.e. the package container to the bucket wheel, as well as a wheel for taking it out of the bucket wheel. Such a construction is limiting in the type of package containers which could be carried, i.e. package containers of cylindrical shape. For this reason there is no way to handle other shaped package containers but to make the structure of the apparatus more complicated unless the sectional view of the package container is circular in shape. Otherwise it is difficult to handle with a bucket wheel.

In addition since the small package containing the straw or spoon is sometimes longer than the package container is tall or wide, it is necessary that the small package be adhered to the package container in an oblique direction on the diagonal of the sideface of the package container. Therefore, an automatic adhering device, which adheres these bag-like packages obliquely to the food package containers is required and conventionally employs a method of conveying the package container which is maintained in an oblique state and adhering the small bag-like package which is provided in a horizontal or perpendicular direction to the package container. The above-described method makes it necessary to set the package container coming out of a bucket wheel to be in an oblique state so that the structure of the automatic adhering machine is unavoidably complicated. In addition to this, although there is the possibility of setting the shifting direction of the bag-like package obliquely across the conveying direction of the package container such an arrangement has a defect in being unable to form the device to be flat since each of the mechanisms, which are arranged in different directions, cannot be located in the same plane.

SUMMARY OF THE INVENTION

Accordingly it is a general object of the present invention to provide an apparatus for the application of wrapped articles to package containers which overcomes the difficulties of the prior art discussed above.

It is another object of the present invention to provide an apparatus for the application of wrapped articles to package containers which only requires a single bucket wheel.

It is another object of the present invention to provide an apparatus for the application of wrapped articles to package containers whose bucket wheel can handle package containers of a shape other than circular.

It is yet another object of the present invention to provide an apparatus for the application of wrapped articles to package containers whose bucket wheel is a simple mechanism.

It is still another object of the present invention to provide an apparatus for the application of wrapped articles to package containers which includes a transferring and sealing means which can adhere a small bag-like package to the package container at an oblique angle.

The objects of the present invention are accomplished by a unique apparatus for the application of wrapped articles to package containers. The apparatus includes a feeding device by means of which a continuous band of wrapped articles are supplied in a controlled way, a cutting device by means of which one by one of the wrapped articles are separated from a the band of articles, a transferring and sealing device by means of which the separated articles are transferred to and sealed to the surface of the package container, a bucket wheel by means of which the package containers are brought in position for the application of the wrapped articles to the package containers and a conveyor by means of which the packages are conveyed to and away from the bucket wheel. The apparatus is further characterized in that the bucket wheel is provided with an odd number of compartments each of which is adapted to receive one of the package containers. The pitch between the package containers on the conveyor is twice the pitch between the compartments of the bucket wheel and the bucket wheel and the carrier are synchronized in such a way that every second compartment of bucket wheel will coincide with a package container brought forward on the conveyor, which package will be transferred from the conveyor to a compartment of the bucket wheel. In addition every second compartment of the bucket wheel will deliver to the conveyor a package container with the article adhered thereto and that the packages provided with articles adhered thereto will thereafter be released from the bucket wheel and placed on the conveyor by means of which the package containers are transported away from the bucket wheel.

In addition, the transferring and sealing device includes a drum which turns in synchronism with a bucket wheel in such a way that the direction of the rotating shaft of the transfer drum is inclined to the shaft of the bucket wheel one half of the inclining angle at which the article is to be adhered diagonally over the side of the package container.

BRIEF DESCRIPTION OF THE DRAWINGS

The above features and objects of the present invention will become more apparent with reference to the following description taken in conjunction with the accompanying drawings wherein like reference numerals denote like elements and in which.

DETAILED DESCRIPTION OF THE INVENTION

Figure 1:
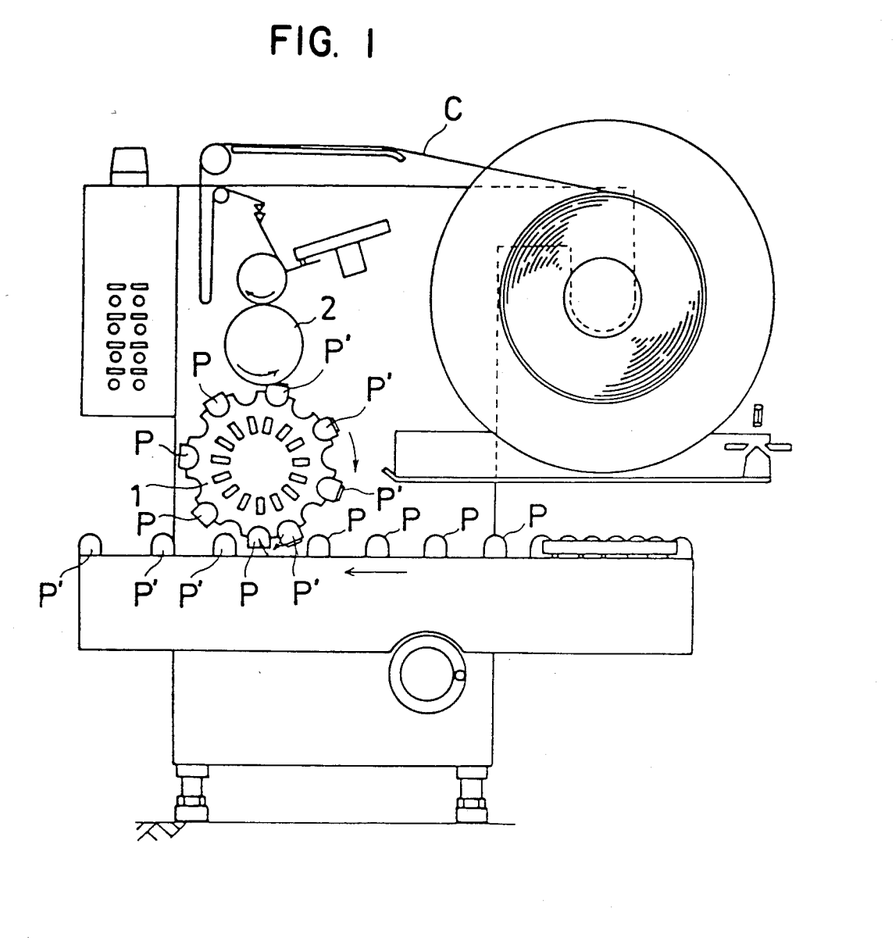
FIG. 1 is a front view of a device for adhering a spoon to a package container in accordance with the teachings of the present invention.
Figure 2:
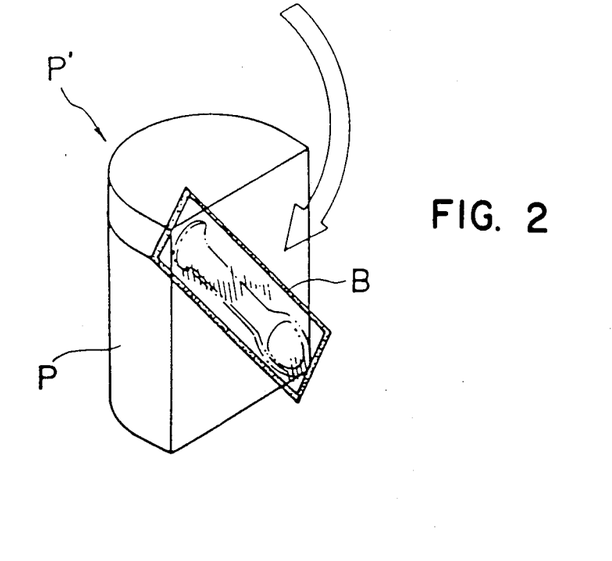
FIG. 2 is a perspective view of a package container to which a small bag containing the spoon is adhered.

Referring to FIG. 1 shown therein is a front view of a spoon adhering device provided with a device for supplying the package container P to the bucket wheel 1 and taking it out of the bucket wheel 1 in accordance with the teachings of the present invention. The rotation of the bucket wheel 1 is accompanied by picking up of the package container P which is successively conveyed by the bucket conveyor so that package container P may be held by the bucket wheel 1. The bucket wheel 1 rotates until the package container P comes in contact with a small bag B containing the spoon A which is transmitted by the drum for transferring the bag B. When the package container P reaches the upper position due to the rotation of the bucket wheel 1, the small bag B, as shown in FIG. 2, is adhered to the side of the package container P, which is subsequently transmitted down in successive order and reaches the conveyor which is moving towards the left side of the drawing.

Figure 3:
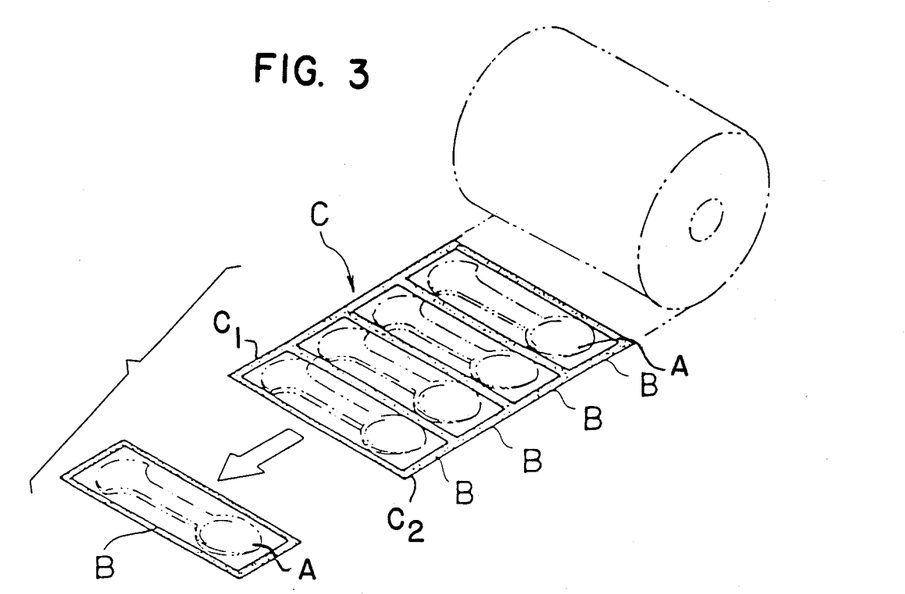
FIG. 3 is a perspective view of a small bag containing a spoon, and a long and narrow strip of package.

The small bag B contains the spoon A and is, as shown in FIG. 3, formed by means of cutting the small bags B one by one during an intermediate step of the process from a long and narrow strip of continuous package C comprising two sheets of synthetic resin film between which the spoon A is inserted and thereafter welded at predetermined positions.

FIGS. 4 through 10 illustrate the flow of the process in which the package container P is successively supplied from the bucket conveyor 3 to the bucket wheel 1, in which the small bag B is adhered to the package container P when it reaches the upper position of the rotating process, in which the small bag B together with the package container P is then transferred down and the package container P' to which the small bag B is successively fed out of the bucket wheel 1 and carried out by the conveyor.

The bucket wheel 1 is provided with an odd number of package container receptacles D (buckets) and the bucket conveyor 3 is arranged horizontally below the bucket wheel 1. The pitch between the buckets of the bucket conveyor 3, i.e. the pitch between normal positions of the package container P fixed by convex portions pushing the package containers P so as to feed them, is double in width of the interval between the buckets of the bucket wheel 1, both buckets being formed to be in the same phase at the bottom of bucket wheel 1 where the bucket wheel 1 has access to the bucket conveyor 3.

Figure 12:
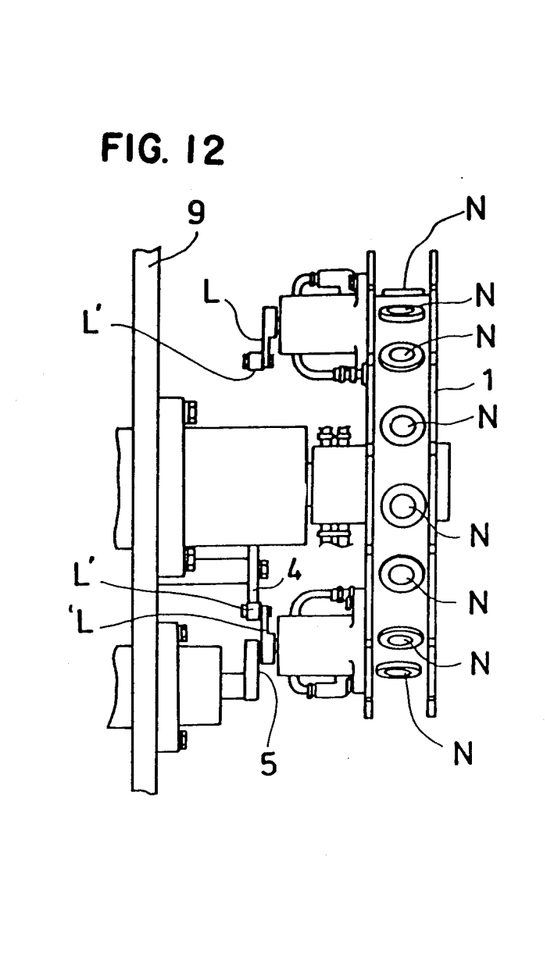
FIG. 12 is a side view of the relationship between the bucket wheel and the cam.
Figure 13:
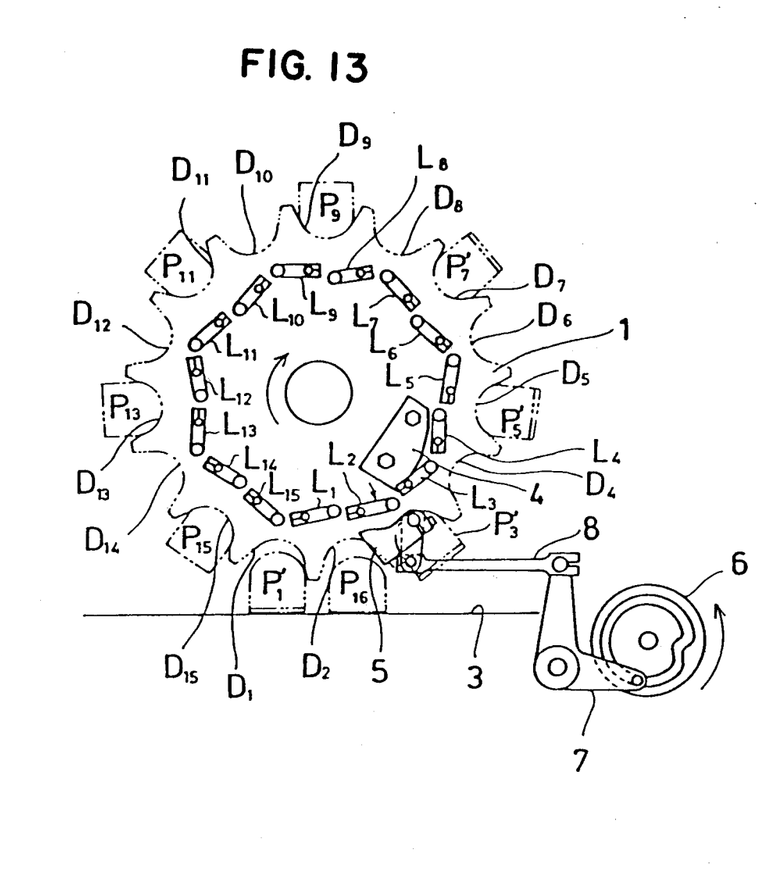
FIGS. 13, 14, 15 and 16 are views relating to the actuation in which the valve transfer lever provided on the bucket wheel and the fixed cam and movable cam on the main body cooperate with each other.

As shown in FIGS. 1 and 12 the suction pipes N for picking up the package containers P by vacuum action are provided with an aperture on the bottom of the buckets D provided on the periphery of the bucket wheel 1. Each of these suction pipes N is provided with a valve for providing a suction action and releasing such suction action and a valve transfer lever L for opening and closing the valve. The vibrating motion of the transfer lever L causes the suction pipes N to pick up the package containers P in the direction towards the buckets D by the suction action generated by the vacuum or to be released from such action to thereby make the package containers P free from the pick up or suction force. At the main body side on which the bucket wheel 1 is provided, a fixed cam 4 is rotatably supported directly by a frame 9. Movable cam 5 is rotatably supported through a bearing on the frame 9. The cams 4 and 5 are provided in such a manner so that they touch a rotating locus of an actuating roller L' pivoted to the top end of the valve transfer lever L.

Referring to FIGS. 13 through 16, shown therein are views illustrating the relationship between each of the valve transfer levers L which are provided on the bucket wheel 1 and the fixed cam 4 as well as the relationship between the valve transfer levers L and the movable cam 5 which is rotated in an interlocking manner with the bucket wheel 1.

Figure 4:
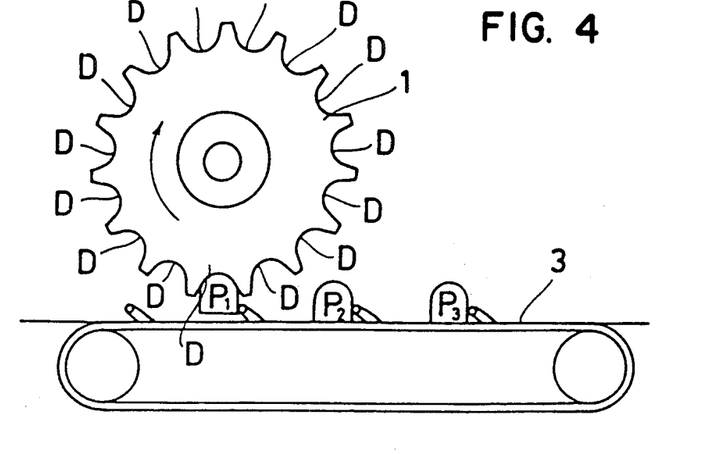
FIGS. 4, 5, 6, 7, 8, 9 and 10 are views illustrating the actuating state in which the package container is supplied to the bucket wheel and taken out therefrom.
Figure 5:
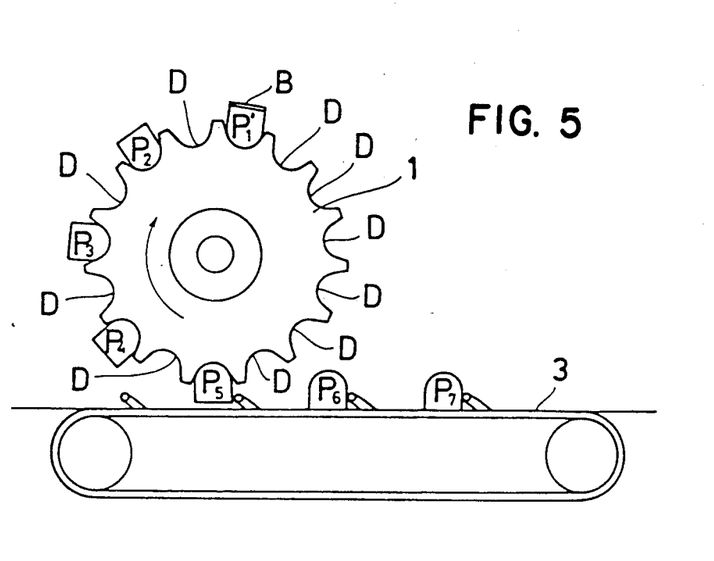
Figure 6:
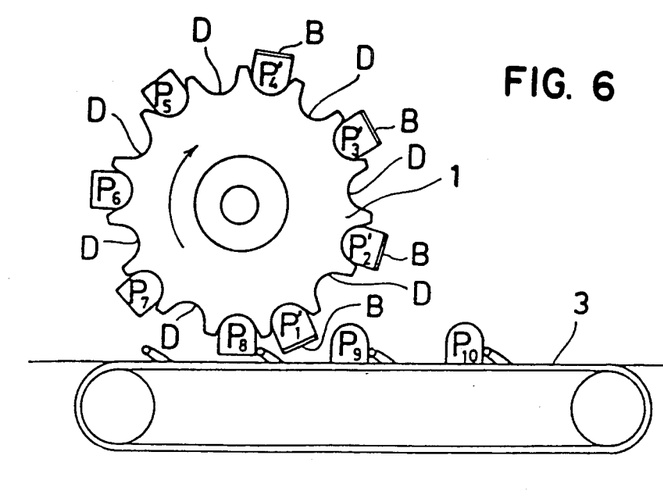
Figure 7:
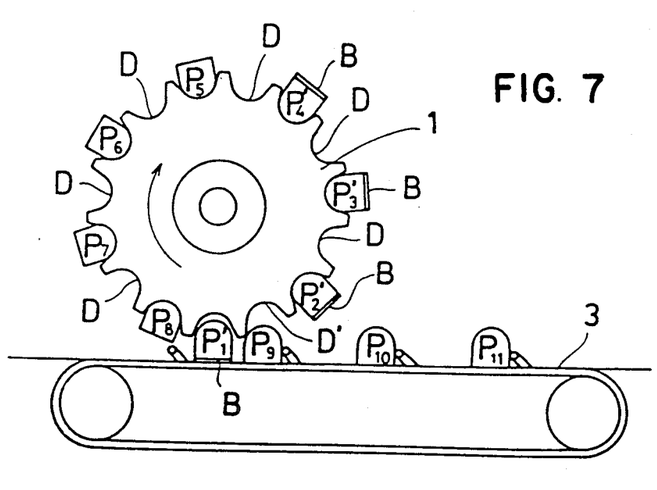
Figure 8:
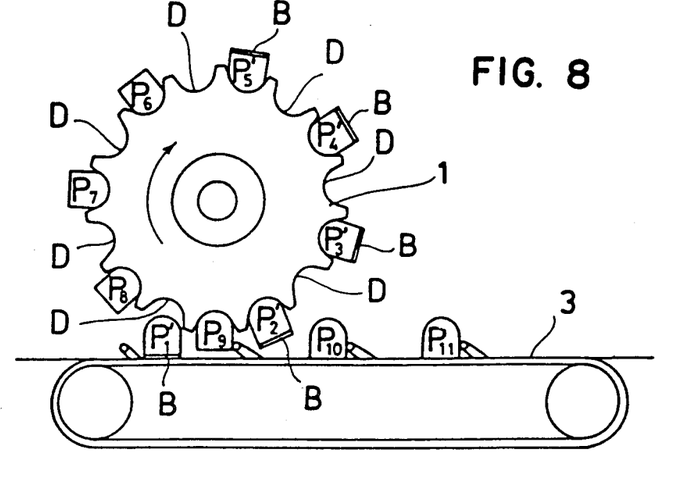
Figure 9:
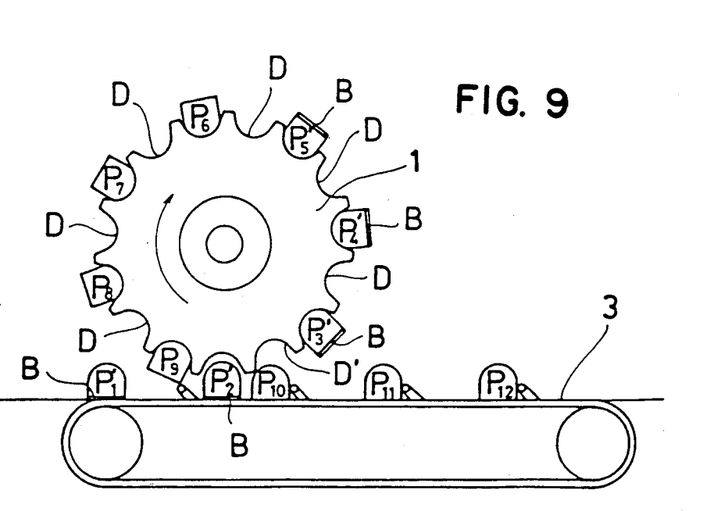
Figure 10:
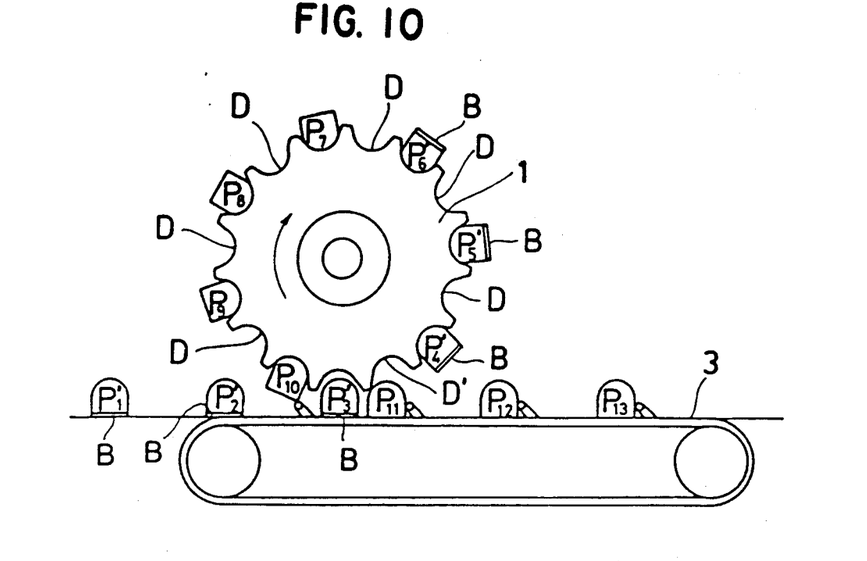
Figure 11:
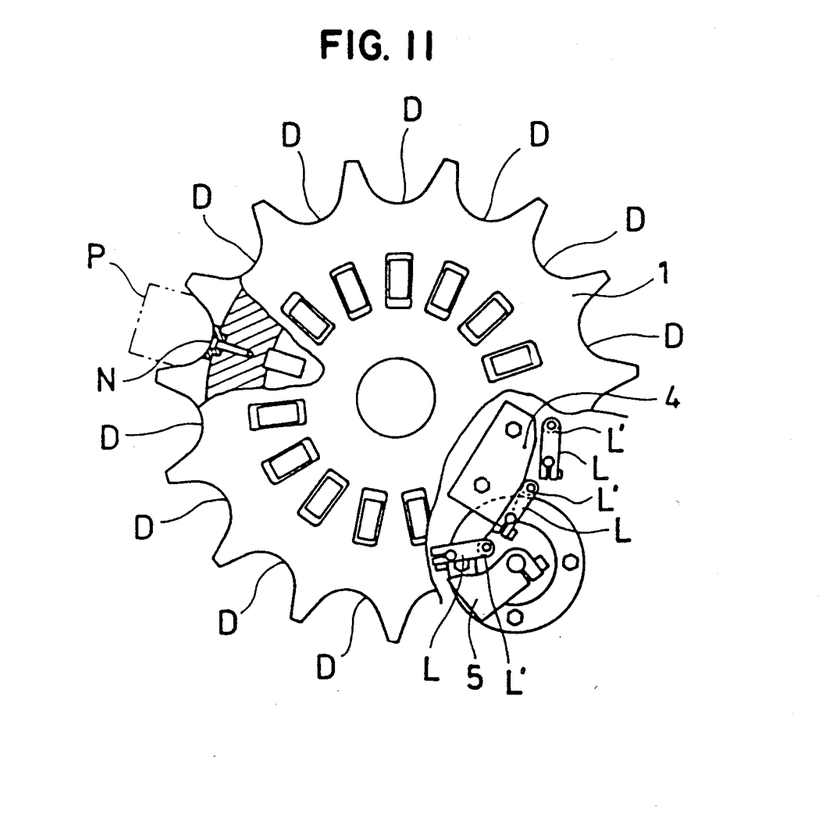
FIG. 11 is a front view of the relationship between the bucket wheel and cam with the bucket wheel being partially cut-away.

Fixed cam 4 pushes the actuating roller L' provided on the end of the valve transfer lever L so that it is rotated such that vacuum suction is applied to the suction pipe N so that the package container 1 can be picked up; whereas the movable cam 5 interlocking with the rotation of the bucket wheel 1, is adapted to be vibratingly moved through a crank 7 and a connecting rod 8 by a circular cam 6 which rotates once everytime the bucket D of the bucket wheel 1 moves two pitches of rotation corresponding to a double interval between the buckets D. When the bucket D of the bucket wheel 1 reaches a position right under the bucket wheel 1 near the bucket conveyor 3, the movable cam 5 pushed the valve transfer lever L to cut off the suction action to the suction pipe N whereby the package container P is released from the suction force and is brought out of the bucket wheel onto the conveyor 3. Next, the actuation of the above-described device will be described. As shown in FIG. 4, the package container P1 which has reached a position right under the bucket wheel 1 after being carried by the bucket conveyor 3 is housed in the bucket D of the bucket wheel 1 by means of being picked up thereinto. In some cases in order to facilitate the picking up action, it may be advantageous to have another separate means for pushing up the package container P in synchronism with the picking up by the bucket wheel 1. Subsequently, when the bucket wheel 1 turns clockwise by two pitches corresponding to two intervals between the buckets D, the package container P2 which is being conveyed by the bucket conveyor 3 is housed and picked up into this second bucket D after the package container P1. Thus, with the continual rotation of the bucket wheel 1, the package containers P on the bucket conveyor 3 are housed one by one in every other bucket of the bucket wheel 1 by being picked up thereinto. When the package container P1 approaches the top position, the small bag B is transferred and adhered thereto by a drum for transferring the package B. The package containers P1', P2' and P3' to which the small bag B has been adhered to are successively transmitted downward and the package container P1' to which the small bag B was ahered to reaches a position which is located one pitch this side of the position at which the package container P was located in undergoing the last pick up action (see FIG. 6). This time, the bucket D and bucket conveyor 3 which possesses a pitch double in width of the pitch between the bucket D of the bucket wheel 1, is located at a position under the bucket wheel 1 into which the package container P1' from the bucket conveyor 3 by means of being picked up at the first part of the process. As a result the package container P8 on the bucket conveyor 3 is housed in the bucket D of the bucket wheel 1 by means of being sucked thereinto. Subsequently the package container P1' which was picked up at the first part of the process reaches the above-described position and a mechanism which is referred to below is operated to release the package container P1' from the pick up or suction force of the conveyor D whereby the package container P1' fall on the bucket conveyor 3 so that it is taken out therefrom (see FIG. 7).

At this time, the following empty bucket D to which the package container P1' was housed by means of being picked up, of the bucket wheel 1 is in a position to be actuated for the pick up action and the subsequent package container P9 on the conveyor 3 is removed synchronously with the motion of the void bucket D' of the bucket wheel 1. When the void bucket D' of the bucket wheel 1 reaches the lowest position, the package container P9 is housed in the void bucket D' by means of being picked up into and the package container P1' which fell onto the conveyor belt 3 remains to be carried away on the conveyor 3 (see FIG. 8). After that and in a similar manner to that described above, the package container P2' falls on the conveyor 3 to be taken away while the package container P10 is housed in the void bucket D' by means of being picked up and the package container P3' on the bucket wheel 1 falls onto the conveyor 3 and the flow of process is successively repeated (see FIGS. 9 and 10).

Figure 14:
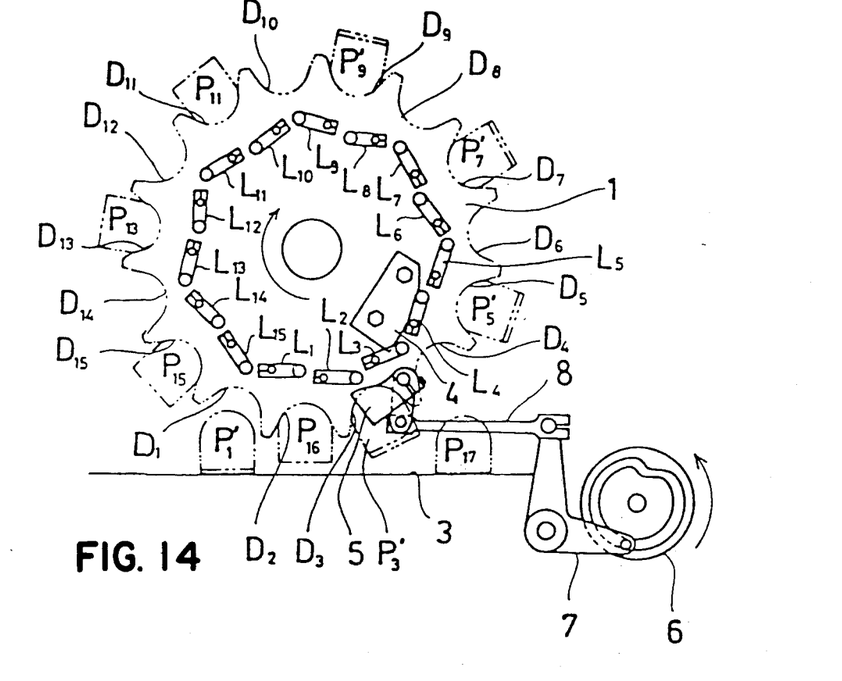
Figure 15:
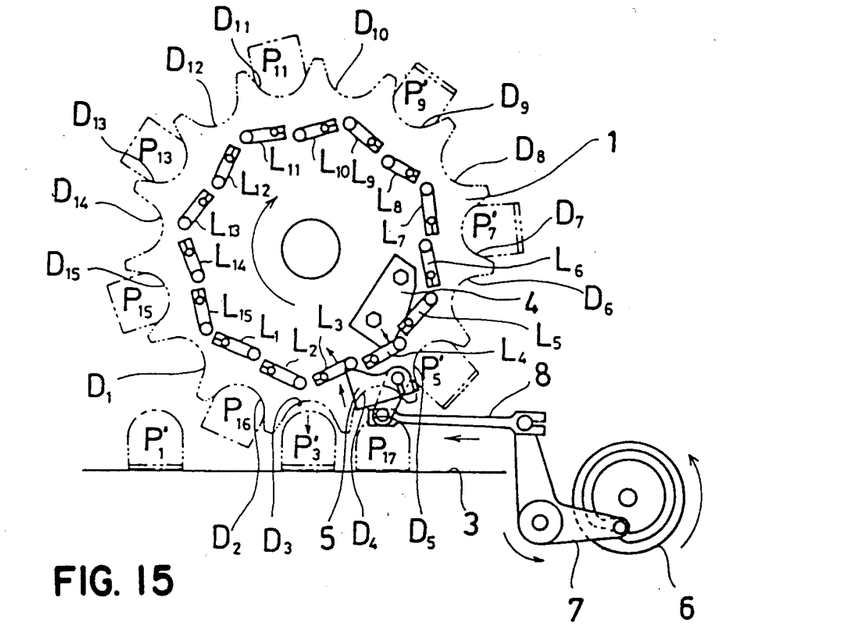

Next, the actuation of the valve transfer levers L to turn on and off the suction action of the suction pipes N provided in the bucket D will be described. In the states as shown in FIG. 15 where the valve transfer lever L1 for the suction pipe N of the bucket D1 of the bucket wheel 1 is pushed by the movable cam 5 whereby the vacuum is removed from the suction pipe N to release the package container P from the sucking force so that it falls on the conveyor 3 and is carried thereon, the suction pipe N for the bucket D2 of the wheel 1 is in a position to have a sucking action applied thereto when the valve transfer lever L2 from the bucket D2 is pushed by the fixed cam 4. At the same time the movable cam 5 which has just completed movement to push the transfer valve L1, is withdrawn from the rotational locus of the actuating roller L' of the valve transfer lever L2. Shown in FIG. 14 is the state in which the bucket wheel 1 turns clockwise to be moved by one half of a pitch between the buckets D from the situation illustrated in FIG. 13. At this time the bucket D2 of the bucket wheel 1, which reaches the position of housing the package container P in the corresponding bucket D, is located near the conveyor 3 and commences to house the package container P16 which is to be carried therein by means of picking it up by suction and additonally the movable cam 5 is still withdrawn from the passage of the actuating roller L' of the valve transfer lever L2. Furthermore, the valve transfer lever L3 which maintains the bucket D3 in the pick up or suction state is not pushed by passes along the external periphery of the fixed cam 4. FIG. 15 illustrates the situation in which the bucket wheel 1 turns clockwise to be moved by one pitch between the bucket D from the state shown in FIG. 14. In this state the rotation engages the valve transfer lever L3 with the movable cam 5 so that the suction action on the suction pipe N of the bucket D3 is removed and the package container P3' which was picked up by the bucket D3 falls onto the conveyor 3 and is taken away.

Figure 16:
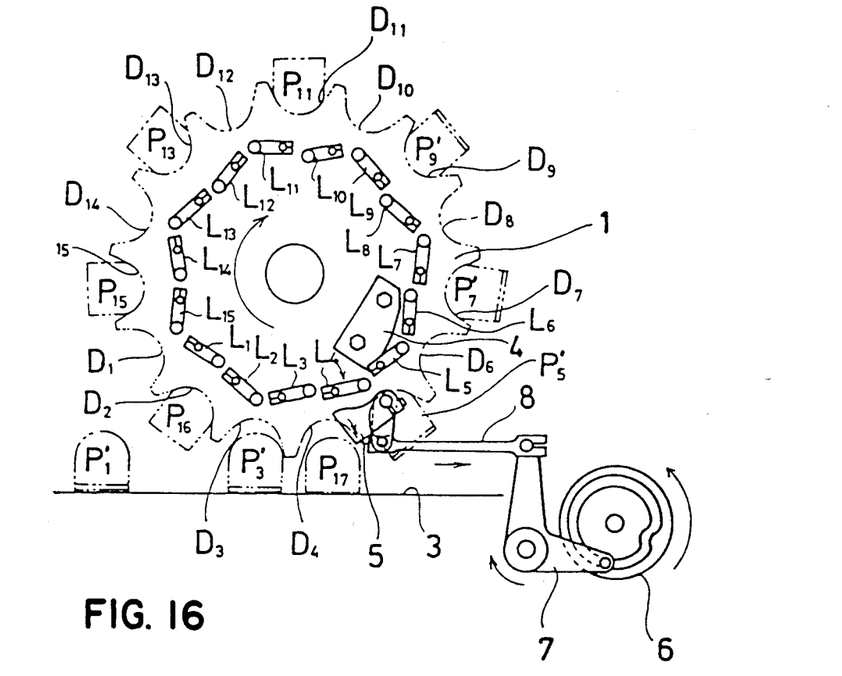

Subsequently in response to the rotation of the bucket wheel 1, the valve transfer lever L4 for the bucket D4 which has heretofore been in the non-pick up state is pushed by contact of the roller L' of the valve transfer lever L4 with the fixed cam 4 and the suction pipe N of the bucket D4 is provided with suction action. FIG. 16 illustrates the state at which the bucket wheel 1 is moved clockwise by one half of the pitch between the buckets from the state shown in FIG. 15, i.e. the state in which a two-pitch turn is made in a clockwise direction from the state shown in FIG. 13. At this time, the movable cam 5 is withdrawn from the state shown in FIG. 15 and together with carrying the package containers P1' and P3', the suction pipe N of the bucket D4 while maintaining the pick up action reaches a position directly through the rear while the transfer lever L4 for the bucket D4 of the wheel 1 is not pushed by the movable lever L5 so that the package container P17 is housed in the bucket D4 by means of being picked up or sucked thereinto. Thus, the fixed cam 4 generally causes the valve transfer lever L to provide suction action to the suction pipes whereas the movable cam 5 generally stops the application of suction to the suction pipes N so that the package containers P can be taken out on the conveyor 3.

From the foregoing description it should be apparent that when comparing the present invention to the prior art device for supplying and taking out the commodity to be carried by a bucket wheel, not only is wheel for inserting the commodity from the conveyor to the bucket wheel but a wheel for taking out the commodity from the bucket wheel to the conveyor are not needed so that the structure of the present invention is made simple and it is possible to handle commodities with a cross-section other than circular, i.e. semi-circular, etc.

Since housing the package container P, i.e. the commodity to be carried by the bucket D of the bucket 1, to be held the bucket and taking out of the wheel 1 can be performed only by setting the suction action of the suction pipe N of the bucket wheel 1 to the ON/OFF state through the corresponding actuation of the levers L by the fixed cam 4 and movable cam 5 which are provided on the body, the structure of the present invention is simple and no electrical control is required for the vacuum valves.

Figure 17:
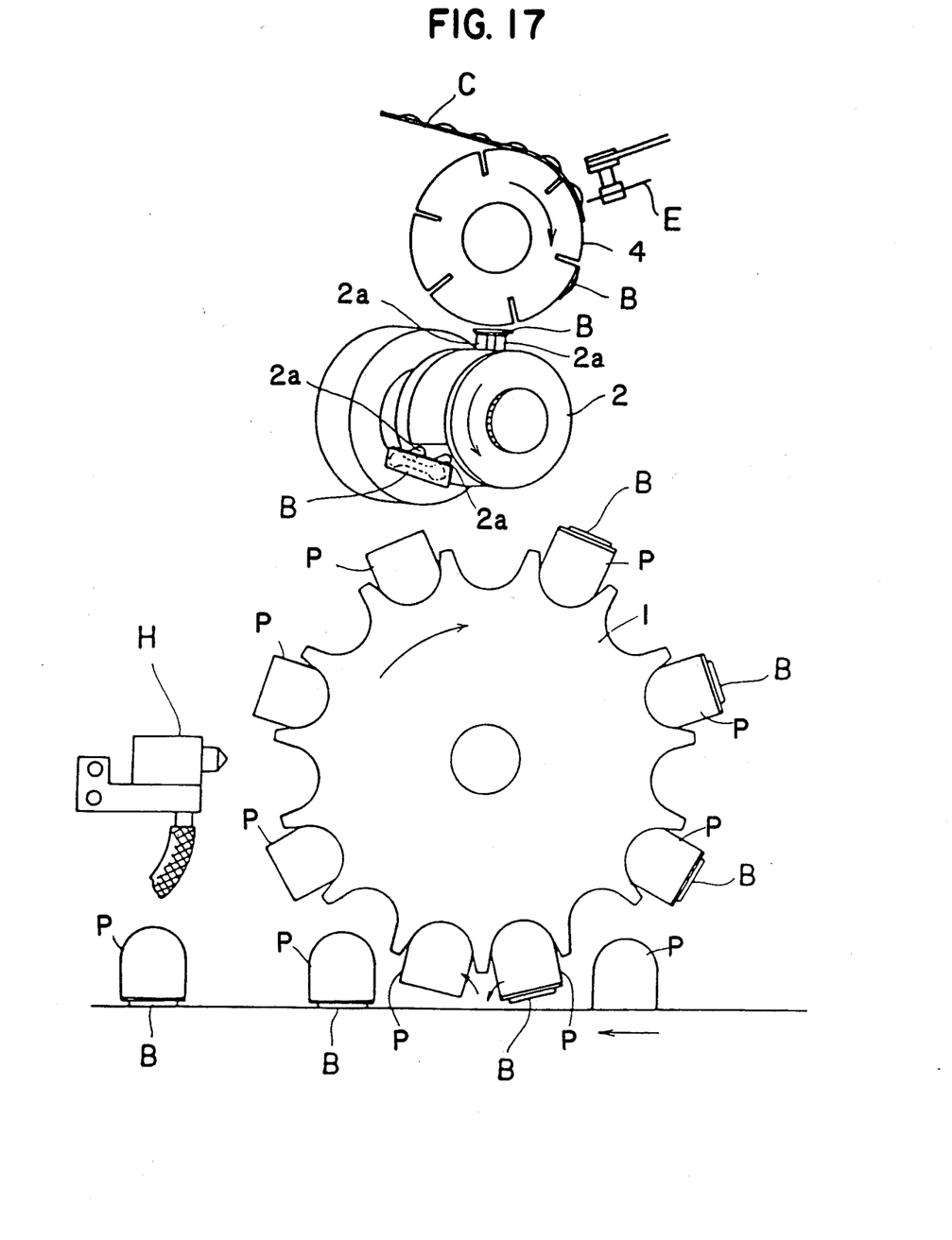
FIG. 17 is a front view of an adhering device including a sealing and transferring device in accordance with the teachings of the present invention.
Figure 18:
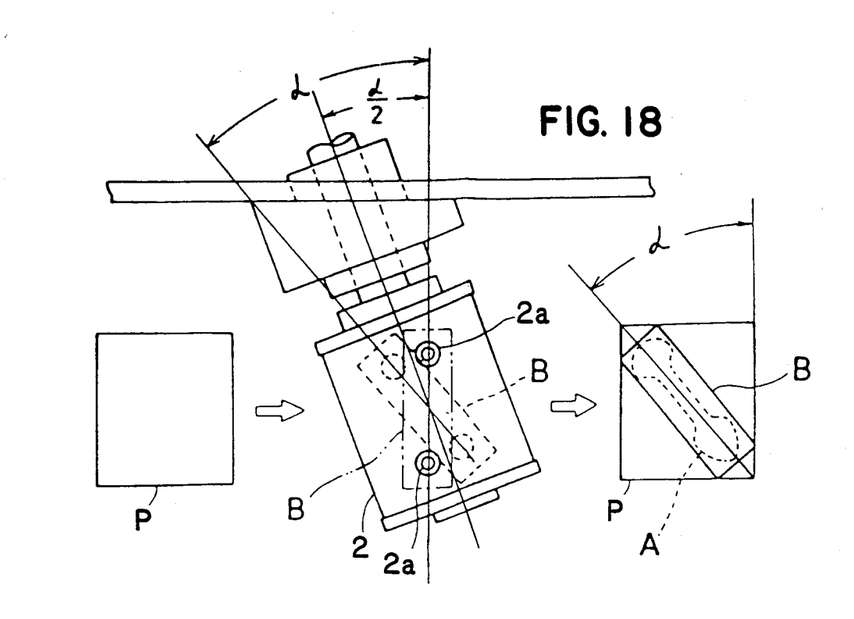
FIG. 18 is a view illustrating the principal of forming the relationship between the transferring drum and the package container at the time of oblique adhesion.

Referring to FIGS. 17 and 18 shown therein is an additional feature of the present invention in which the sealing and transferring device adheres the package B to the package container P obliquely. In the figures, the long and narrow strip of continuous package C is made from two sheets of synthetic resin film C1 and C2 into which spoons A are inserted as shown in FIG. 3 and part of the film C1 and C2 are welded. In addition the spoons A are conveyed at a pitch equal to one small bag B and are picked up from a feed correcting device (not shown) to package supplimenting drum 4 which turns clockwise intermittently. A cutter E separates the small bags B from the long and narrow strip of continuous package C at each pitch. A bucket wheel 1 contains the food package container P as shown in FIG. 2 to the position at which the small bag B containing the spoon is adhered to the container P.

Bucket wheel 1, possessing buckets D for receiving the package containers P in an odd number, picks up the successive package containers P one by one when they are conveyed under the bucket wheel 1 by the conveyor 3 and reach a point just below the bucket wheel 1. To the side of the bucket wheel 1 is provided a hot melt gun H for spraying hot melt adhesive to the side face of the package containers P held in the bucket wheel 1. In particular the hot melt gun H sprays hot melt adhesive onto the sideface P' of the package container P and subsequently a small bag B containing the spoon A which is transferred down by a drum for transferring a package 2 and is provided obliquely with regard to the base plate is adhered to the package container P.

The drum for transferring the package 2, provided between the package supplimenting drum 4 and the bucket wheel 1 which is rotated synchronously with both units so as to change the direction of the small bag, has the direction of its rotating shaft made at an inclination equal to one half of the inclined angle $\alpha$ at which the small bag B is adhered obliquely to the diagonal direction on the sideface P' of the package container P with regard to the axial of direction of both axes of the package supplimenting drum 4 and the bucket wheel 1 as shown in FIG. 18. A pair of suction pipes 2a are provided at locations which provide the external periphery of the drum for transferring the package 2 into three equal parts in a manner such that their inclining angle with regard to the shaft of the drum for transferring the package 2 becomes one half $\alpha$ so that they fall in line with the surface including the axial line of package supplimenting drum 4 from bucket wheel 1 when the move upwardly. The pick up force of the package supplimenting drum 4 is larger than that of the suction pipe 2a.

Next, the actuation of the device that carries out the present invention will be described as follows. As shown in FIG. 17, a long and narrow strip of package C in which the small bag B containing the spoon A is packed, is picked up at its end by the external periphery of the package supplimenting drum 4 which has numerous suction holes on its surface and it which rotates intermittently clockwise while having its feed pitch corrected by a feed correcting device (not shown). The small bag B is fed one pitch by the peripheral part of the package supplimenting drum 4 whose peripheral speed is more rapid than the feeding speed of the long and narrow strip of package C so that after reaching the predetermined position, the small bag B contained therein is cut out and subsequently each of the bags is carried downwardly by the rotation of the package supplimenting drum 4. When the small bag B reaches the lower end, the suction pipes 2a for picking up or holding the small bag are provided at locations which divide the external periphery of the drum for transferring the package 2 which rotates in synchronism with the package supplimenting drum 4 into three equal parts, reaches the upper end of its rotating locus, i.e. the small bag B shifting position. At this time, since the absorbing force of the package supplimenting drum 4 against the small bag B is smaller than that of the suction pipe 2a of the drum for transferring the small bag 2, the small bag B is taken away from the package supplimenting drum 4 and is picked up or held on the suction pipe 2a of the drum for transferring the package 2. Small bag B held on the suction pipe 2a until it reaches a position at the bottom edge when the drum for transferring the package 2 completes a 180° rotation so that the small bag inclines by $\alpha/2 \times 2 = \alpha$ from the primary position for holding the small bag B, i.e. by an inclination angle $\alpha$ sideface P' of the package container P, as shown in FIG. 18.

On the other hand, the package container P is picked up from the conveyor 3 to a bucket D of the bucket wheel 1, moves rotatably upward and has hot melt adhesive sprayed on the sideface P' of the package container P by the hot melt gun H and subsequently when the small bag B which has been held on the suction pipe 2a reaches the bottom edge, the package container P comes up to the top of its rotating locus so that the sideface P' of the package container P and the small bag B contact each other whereby the small bag B is taken away from the suction pipe 2a by the adhesive on the package container P. That is, the small bag B is adhered obliquely on the diagonal of the sideface P' of the package container P. At that time it is preferable to perform steadily the adhesion by a counter member that presses the small bag B while moving in synchronism with the motion of the small bag B.

Thus, the package container P to which the small bag B is adhered is conveyed downwardly, while being still held to the bucket D of the bucket wheel 1 and when reaching the lowest position, the condition in which the package container held on the suction pipe is released, subsequently the package container P is conveyed away by the conveyor after having fallen thereon.

As clearly described above, since the method of the present invention can continuously adhere the small bag B obliquely to the package container P only by means of making an inclination one half of $\alpha$ at which the small bag B is adhered to the package container P in the drum for transferring the package 2, which transfers the bag B to the package container P in the bucket D of the bucket wheel 1 from the package supplimenting drum 4 a device which creates a complicated motion to adhere the small bag B obliquely to the package container P is not needed and a flat surface is always provided. Furthermore, since one surface of the base plate can be used for the place where the food is handled, whereas another surface (back surface) thereof is formed to serve as the driving part, the device of the present invention has the advantage of being easy to form so that the part for handling the food is washable. An additional effect of the present invention is to also increase the disposing speed since the adhering mechanism simply includes rotational motion.

It should be apparent to those skilled in the art that the above described embodiments are merely illustrative of but a few of the many specific embodiments which represent the applications and principals of the present invention. Numerous and various other arrangements can be readily devised by those skilled in the art without departing from the spirit and scope of the invention.

I claim:

1. An apparatus for the application of wrapped elongated articles such as drinking straws or spoons on package containers, said apparatus comprising a feeding device by means of which a continuous band of the wrapped articles are supplied in a controlled way, a cutting device by means of which one by one of the wrapped articles are separated from said band of articles, a transferring and sealing device by means of which the separated articles are transferred to and sealed to the surface of the said package containers, a package carrier wheel or bucket wheel by means of which the packages are brought in position for the application of said articles to the package and a conveyor by means of which the packages are conveyed to and away from said carrier wheel, characterized in that the said carrier wheel is provided with an odd number of compartments each of which are adapted to receive one of the said packaging containers, said compartments being provided with one or more suction holes or suction cups connectable to a vacuum generating device, and that said carrier wheel or bucket wheel is adapted to cooperate with the said conveyor in such a way that the containers moving against the carrier wheel are caught by the carrier wheel and by means of suction force kepts in one of the said compartments for one full turn of the wheel during which turn said articles are applied to the surface of the packaging containers, and that the packaging containers provided with said articles thereafter are released from the carrier wheel and placed on the conveyor by means of which the containers are transported away from the carrier wheel.

2. An apparatus in accordance with claim 1, characterized in that the pitch between the packages of the conveyor is twice the pitch between said compartments of the carrier wheel, and that the carrier wheel and the conveyor are synchronized in such a way that every second compartment of the carrier wheel will coincide with a package brought forward on the conveyor, which package will be transferred from the conveyor to said compartment of the carrier wheel, and that every second compartment of the carrier wheel will deliver to the conveyor a package provided with said article.

3. A device for supplying and taking out a commodity to be carried to a bucket wheel for transmitting the same characterized such that a bucket wheel possessing around its external periphery buckets in odd number, each of which is equipped with a suction pipe and a valve opened/closed by a valve actuating lever, and a bucket conveyor moving right under said bucket wheel provided in perpendicular state, make a pitch between the latter group of buckets double the width of that between the former group of buckets, these two groups of buckets taking phases synchronous with each other, when the bucket wheel and the bucket conveyor reach the position at which they have access to each other, and a fixed cam and a movable cam are provided on the main body of the present device, touching the rotational locus of an actuating roller of the abovementioned valve transfer lever, in a manner that the fixed cam pushes the valve transfer lever to be moved so that the bucket of the bucket wheel may be in a position to absorb the commodity to be carried by vacuum action, whereas the movable cam, in interlocking with the rotation of the bucket wheel, vibratingly moves once every two pitches between both the ends of the removing distance of the bucket of the bucket wheel, and when the bucket of the bucket wheel reaches the abovementioned position at which the bucket of the bucket wheel has access to the bucket conveyor, the movable cam pushes the valve actuating lever to be moved, whereby the commodity to be carried is made free from suction force generated by the bucket of the bucket wheel so that the commodity is in a position to be taken out, the commodity to be carried being at the abovementioned position supplied to the bucket or fed out of the bucket.

4. An apparatus for the application of wrapped elongated articles such as drinking straws or spoons on package containers, said apparatus comprising a feeding device by means of which a continuous band of wrapped articles are supplied in a controlled way, a cutting device by means of which one by one of the wrapped articles are separated from said band articles, a transferring and sealing device by means of which the separated articles are transferred to and sealed to the surface of the fed package containers, a package carrier wheel or bucket wheel by means of which the packages are dropped in position for the application of said articles to the packages and a conveyor by means of which the packages are conveyed to and away from said carrier wheel, characterized in that the carrier wheel is provided with a number of compartments each of which are adapted to receive one of said packaging containers, said compartments being provided with one or more suction holes or suction cups connected to a vacuum generating device and that said carrier wheel or bucket wheel is adapted to cooperate with said conveyor in such a way that the containers against the carrier wheel are caught by the carrier wheel and by means of suction force kept in one of the compartments for one full turn of the wheel during which turns said articles are applied to the surface of the packaged containers, and that the packaged containers provided with said articles thereafter are released from the carrier wheel and placed on the conveyor belt by means of which the containers are transferred away from the wheel, said suction holes located in said compartments of the bucket wheels or carrier wheels are adapted to and connected to a vacuum source by means of a connecting device, whereby said connecting device consists of a plurality of Venturi tubes, the suction cups and a plurality of transfer valves for connecting or disconnecting compressed air to said Venturi tubes, said valves being located on the external periphery of the bucket wheel or carrier wheel, whereby a hollow driving shaft of the bucket wheel or carrier wheel is connected to a supply of compressed air, which is supplied from the driving shaft to said transfer valves.

5. An apparatus for the application of wrapped elongated articles such as drinking straws, spoons on package containers, comprising a feeding device by means of which a continuous band of the wrapped articles are supplied in a controlled way, a cutting device by means of which one by one the wrapped articles are separated from said band of articles, a transferring and feeding device by means of which the separated articles are transferred to and sealed to the surface of said package container, a package carrier wheel or bucket wheel by means of which the packages are brought in position for the application of said articles to the package and a conveyor by means of which the packages are conveyed to and away from said carrier wheel, characterized in that said carrier wheel is provided with a number of compartments each of which are adapted to receive one of the packaging containers, said compartments being provided with one or more suction holes or cups connectable to a vacuum generating device and that said carrier wheel or bucket wheel is adapted to cooperate with said conveyor in such way that the containers moving against the conveyor wheel are caught by the carrier wheel and by means of suction force kept in one of the compartments for one full turn of the wheel during which turn said articles are applied to the surface of the packaging container, and that the packaging containers provided with said articles thereafter are released from the carrier wheel and placed on the conveyor by means of which the containers are transported away from the carrier wheel, the transferring device comprises a rotatable transfer drum for fetching, holding or transferring an elongated article like a wrapped straw or a wrapped spoon from a supply of articles to a package container, said drum being arranged to turn in synchronism with a packaging container, carrier wheel or bucket wheel in such a manner that the direction of the rotating shaft of the transfer drum is inclined to the shaft of the bucket wheel or carrier wheel one half of the inclining angle at which the elongated article is adhered diagonally over the side of package container.

* * * * *